Oct. 25, 1927.
C. V. PIKE
1,646,930
FOOD CARRYING AND DISPENSING MEANS
Filed Dec. 21, 1925
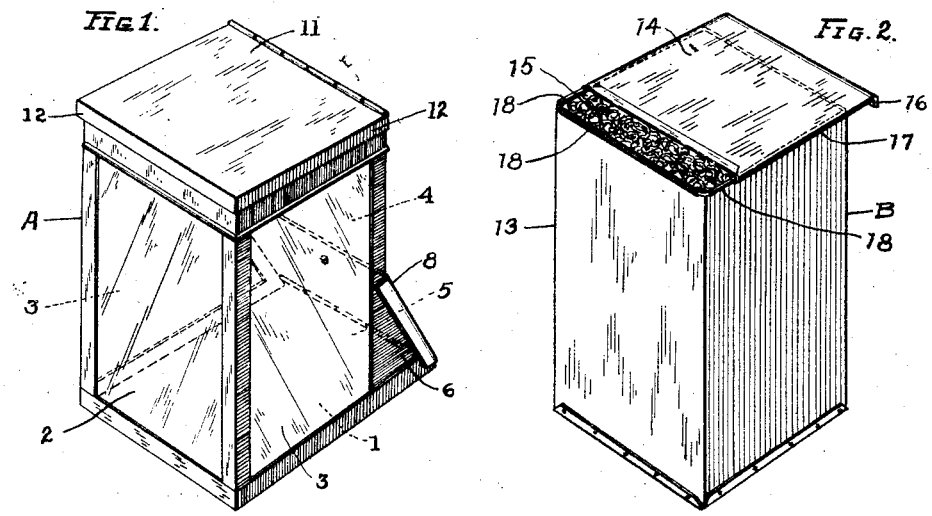
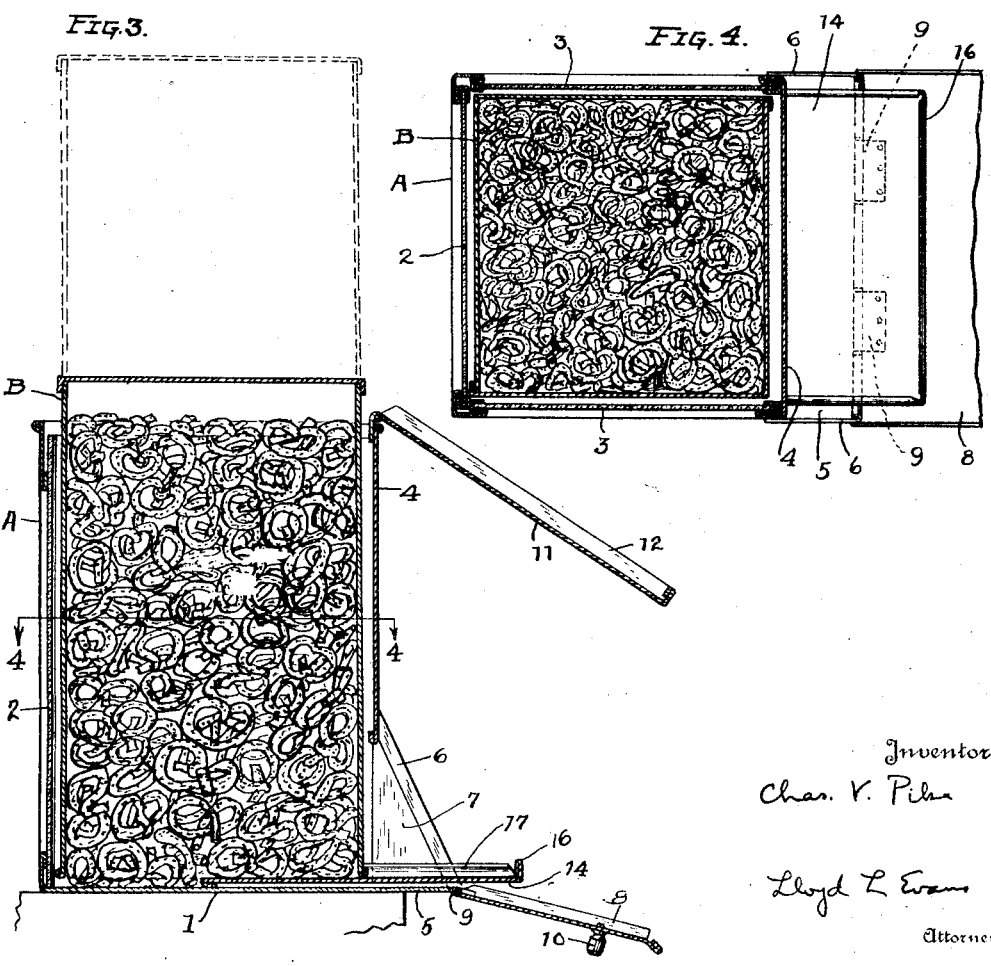
Inventor
Chas. V. Pike
Lloyd L. Evans
Attorney Patented Oct. 25, 1927.

1,646,930

UNITED STATES PATENT OFFICE.

CHARLES V. PIKE, OF CLEVELAND, OHIO, ASSIGNOR OF ONE-HALF TO HARRY A. ORR, OF CLEVELAND, OHIO.

FOOD CARRYING AND DISPENSING MEANS.

Application filed December 21, 1925. Serial No. 76,709.

This invention relates to food containers and display and dispensing devices, and particularly to a container in which food articles, such as pretzels, may be transported and from which they may be transferred to a display and dispensing cabinet without damage to and handling of such food articles.

In common use today are display and dispensing cabinets from which food articles, such as crackers, pretzels, etc., are removed as sold to the individual customer. These cabinets must, of course, be replenished from time to time. It has been found, however, that fragile articles of food, such as crackers and pretzels, have been broken and damaged by the ordinary method of dropping them into a dispensing cabinet by hand, or from a tilted carrying container. Furthermore, it is desirable that such food be not handled by hands in transfer from the carrying container to a dispensing cabinet.

An object of my invention is to provide a method of transferring food articles from a carrying container to a dispensing cabinet without breakage or damage to the said food and without handling thereof by hands.

Another object of the invention is to provide a carrying container from which food articles may be transferred to a dispensing cabinet without damage to the said food and without hands coming into contact therewith.

Other objects of the invention will be apparent to those skilled in the art from the description of it hereinafter given.

Figure 1 is a perspective view of a display and dispensing cabinet adapted to be employed in conjunction with my improved container.

Fig. 2 is a perspective view of my improved container with the closure thereof partly removed showing the container as being filled with pretzels.

Fig. 3 is a vertical section through the dispensing cabinet showing my improved container disposed therein with the closure thereof adjacent to the base thereof and partly removed through the dispensing opening of the cabinet.

Fig. 4 is a horizontal section on line 4—4 of Fig. 3.

In the drawings I have shown a food display or dispensing cabinet A, in conjunction with which a container B according to my invention is adapted to be used. The cabinet A, for use in conjunction with my invention, will now be described in order that it may be more clearly seen how the carrying container B is adapted to cooperate therewith.

The cabinet A is shown as comprising a base 1 on which is mounted a suitable framework supporting a glass front 2 and glass sides 3. A metal back 4 extends from the top of the cabinet toward but stopping short of the base 1. The base 1 extends outwardly beyond the back 4 to form the tray or extension 5. Side pieces 6 extend angularly from the lower edge of back 4 to the outer edge of extension 5. The lower edge of back 4, the edges of side pieces 6 and the outer edge of extension 5 form the boundaries of the dispensing opening 7 from which articles of food in the cabinet may be removed. The opening 7 may be closed by the flanged door 8 mounted on hinges 9, by means of which hinges the door 8 may be swung below the plane of the extension 5 so that the door 8 will not interfere with the removal of the closure 14 which will be more fully described hereinafter. The door 8 is provided with a handle 10. The top of the cabinet is shown as provided with a hinged cover 11, which is provided with downwardly extending flanges 12 to provide a tight fit between the cover and the cabinet.

By means of the door 8 and the cover 11, therefore, the cabinet A may be effectually sealed so as to protect food articles within the said cabinet for a long time against damage or deterioration.

By the ordinary means of replenishing a cabinet A by dropping food articles, such as pretzels etc., therein, there has been considerable breakage of such food articles. The handling of said food articles by hand is also an undesirable feature. By disposing them in prearranged manner and substantially abutting relation to each other in a container B, which I will now describe, the pretzels or other food articles may be conveniently carried from the bakery to a store or other place where the cabinet A is located and the food articles may be readily transferred to the cabinet without breakage or handling.

The carrying container B preferably comprises a box 13 of substantially the same shape but slightly smaller than the interior dimensions of said cabinet A so that the container B may substantially telescope into the cabinet A. Where the container B is to be used more or less permanently, it may be composed of a suitable material, such as galvanized iron or fiber board. If, however, the container B is to be thrown away after use, other materials, such as paper, may be employed. The box 13 is provided with a closure 14, which is preferably removable in the plane of the open end 15 of the box 13. In the drawings, the cover 14 is shown as having a flanged portion 16 at one end and as being slidably removable from the opening 15 of the box. The turned over portions 17 of the closure 14 cooperate with the rounded or beaded edges 18 of the box 13 for this purpose. If the box 13 is square in cross-section, the closure 14 may, of course, cooperate with any pair of opposed edges 18.

The container B filled with food articles, such as pretzels, and with the closure 14 substantially fully closed, may be disposed within the open cabinet A in a substantially inverted position with the closure 14 adjacent to the base 1 and with the flange 15 adjacent to the dispensing opening 7. The door 8 may be opened and the closure 14 removed through the opening 7. The box 13 is then lifted upwardly out of the cabinet A as indicated by the dotted lines in Fig. 3, after which the cover 11 may be closed.

It will be seen that the food articles, such as pretzels, may, by my improved container and method, be disposed in a dispensing cabinet without breakage and without handling.

It will moreover be seen that fragile, brittle, breakable or readily bruised food articles of the class described, such as, for example, pretzels, crackers, doughnuts, peaches and the like, may by my invention be readily transported in a carrying container and disposed in a dispensing cabinet while maintaining the food articles in substantially the same relative position to each other as in the carrying container.

The closure 14 may be of any suitable type, said closure being preferably removable through the plane of the opening 15. Thus, in the case of a container B made of paper, an end closure 14 might be separated from the box 13 by any suitable means, such as a draw-string, and then slid out through the dispensing opening 7. Pretzels may thus be placed in the carrying container B at the bakery and need not be handled until removed from the cabinet A when sold to the individual customer.

To those skilled in the art many modifications of and widely differing embodiments and applications of my invention will suggest themselves, without departing from the spirit and scope thereof. My disclosures and the descriptions herein are purely illustrative and are not intended to be in any sense limiting.

What I claim is:

1. The method of carrying food articles of the class described and replenishing a display and dispensing cabinet having a solid base and a lateral dispensing opening adjacent said base, which comprises placing the food articles in prearranged substantially abutting relative position to each other in a container arranged to be closely telescoped into said cabinet, carrying said container to said cabinet, telescoping said container substantially completely into said cabinet, and subsequently transferring said food articles into said cabinet while maintaining said food articles in substantially the same relative position to each other as in said container by removing said container outwardly of said cabinet.

2. In food carrying and dispensing apparatus, in combination, a display and dispensing cabinet having a dispensing opening adjacent the base thereof, and a container for carrying food articles to said dispensing cabinet and disposing them therein, said container having a slidably removable end closure, and being adapted to be telescoped into said cabinet with said container closure adjacent the base of said cabinet, said container closure being removable through said dispensing opening, whereby said container may be removed upwardly and outwardly of said cabinet to transfer said food articles to the dispensing cabinet in undamaged condition.

3. The method of transferring food articles from a carrying container having a removable end closure to a dispensing cabinet having a solid base and a dispensing opening adjacent said base, which method comprises disposing said container in inverted position within said cabinet with the closure of said container adjacent the base of said cabinet, removing said closure through said dispensing opening, and removing the container upwardly and outwardly of said cabinet, whereby said food articles are transferred to the dispensing cabinet in undamaged condition.

In testimony whereof I affix my signature.

CHARLES V. PIKE.